Aug. 22, 1933.   J. G. CRAIG   1,923,664
TOBACCO LATHE HOLDER
Filed Nov. 20, 1931
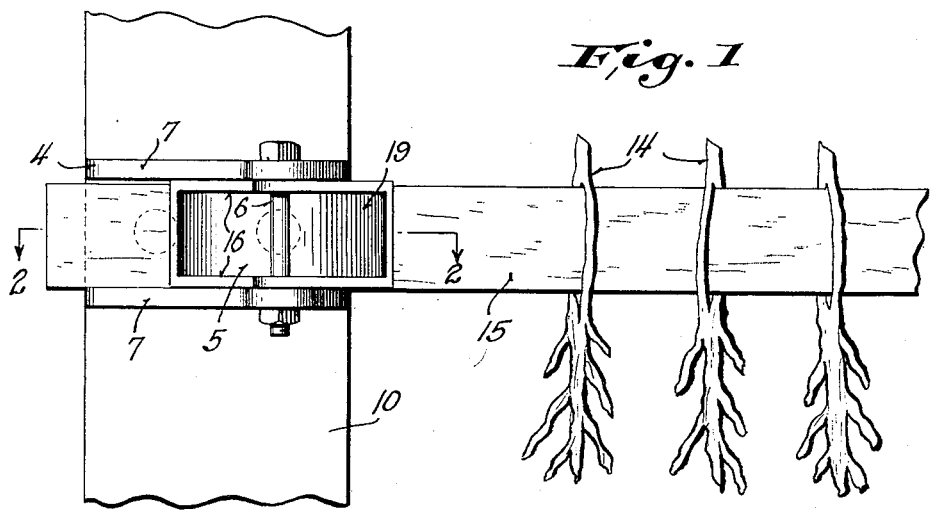
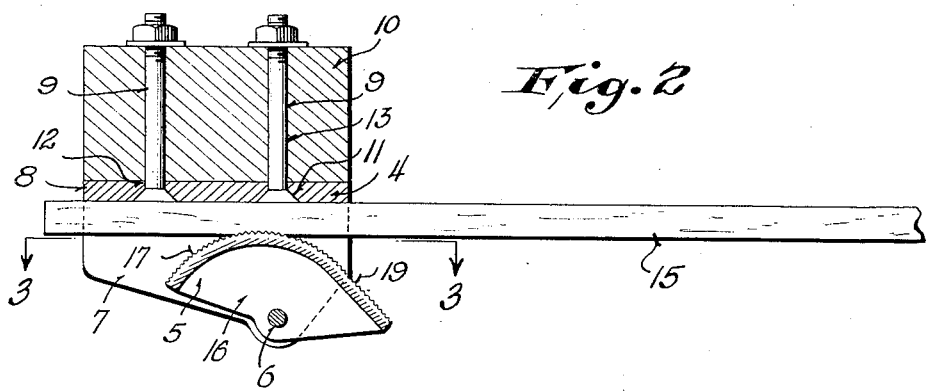
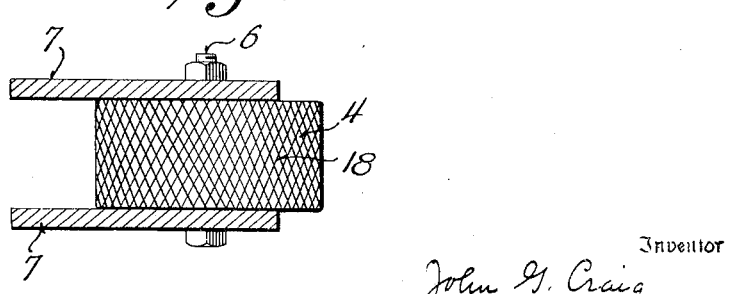
Inventor
John G. Craig
Louis O. French
Attorney Patented Aug. 22, 1933

1,923,664

UNITED STATES PATENT OFFICE 1,923,664

TOBACCO LATHE HOLDER

John G. Craig, Stoughton, Wis.

Application November 20, 1931
Serial No. 576,231

1 Claim. (Cl. 131—21)

The invention relates to tobacco lathe holders.

After tobacco plants are harvested from the field, the stalks are slit and impaled on what are called lathes and hung up to dry or cure and after this step the leaves are stripped from the plants while on the lathes and the stalks then pulled off the lathes. For this stripping operation and stalk removal it is highly desirable to have a holder for this lathe by which the lathe may be supported in a convenient position for the operator and the mounting and dismounting of the lathe in the holder should be a simple operation that may be quickly accomplished. The object of the present invention is to provide a very simple and quickly manipulated holder whereby the lathe may be quickly inserted in the holder and firmly held therein until the stalks are removed and then readily released, the holder embodying what may be termed a self-locking jaw.

The invention further consists in the several features hereinafter set forth and more particularly defined by the claim at the conclusion hereof.

In the drawing, Fig. 1 is a side elevation view of a holder embodying the invention;

Fig. 2 is a detail sectional view taken on the line 2—2 of Fig. 1;

Fig. 3 is a detail sectional view taken on the line 3—3 of Fig. 2.

The holder embodying the invention embodies a relatively fixed jaw member 4 and a movable jaw member 5 pivotally mounted on a pin 6 that is conveniently supported on the sides 7 of the member 4 which is conveniently made of general channel section to provide the sides 7 and the base portion 8 which is apertured to take the bolts 9 by which the device may be secured to a fixed support 10, said bolts having their heads mounted in countersunk recesses 11 in said base portion 8 and passing through the holes 12 and the alined holes 13 in the support 10 which may be a vertically disposed wooden two by four, the holder being mounted at a height convenient for the operator working on the plants, the stalks 14 of some of which are shown on the lathe 15.

The movable jaw 5 has sides 16 and a clamping face 17 which is curved eccentrically relative to the center of rotation of said jaw and is preferably roughened as by knurling 18 and there is a part 19 beyond this curved surface which acts as a handle or part that may be pressed upon by the operator to assist in the initial engagement of said jaw with the lathe.

In working the device, assuming the jaw 5 has been turned slightly from the position shown in Fig. 2 in a counter clockwise direction so that the inner end of the lathe may be inserted freely between the jaws, after said end is so inserted, the operator presses outwardly on the part 19 so as to swing the jaw 5 back to an engaging position and then as he pulls forwardly on the lathe, the eccentric face 17 of the jaw is moved into firm clamping engagement with the lathe which is then firmly held between the jaws, the harder the operator pulls forwardly, the firmer being the engagement, it being noted that the firm anchorage for the lathe is required, especially when the stalks 14 are being pulled off from the lathe. After the leaves of the dried plants have been stripped therefrom and the stalks are removed from the lathe while the lathe is so held, the operator releases the lathe from the holder by pushing it inwardly, that is toward the left as viewed in Fig. 1 which causes the jaw 5 to turn to a release position so that the lathe may be readily withdrawn. The total time for the operation for mounting the lathe in the holder and releasing it therefrom is only a matter of a few seconds so that the operator's time is conserved over known methods.

The face of the fixed jaw 4 may also be roughened in a manner similar to that of the face 17 if desired and other ways of roughing the lathe engaging face or faces of the holder than knurling may be used.

I desire it to be understood that this invention is not to be limited to any particular form or arrangement of parts except in so far as such limitations are included in the claim.

What I claim as my invention is:

In a tobacco lathe holder, the combination of a member having a base portion and side flanges forming a lathe receiving channel, means for clamping said member to a fixed support, a movable jaw of channel form having its web formed as a clamping face of substantially the width between said side flanges and curved eccentrically to its pivot to effect a clamping action of said jaw as said lathe is moved in one direction and a release of said jaw as the lathe is moved in the opposite direction, said web of said jaw having an extension for assisting in the initial engagement of said movable jaw with the lathe.

JOHN G. CRAIG.